(12) United States Patent
Tanaka et al.

(10) Patent No.: US 6,651,440 B2
(45) Date of Patent: Nov. 25, 2003

(54) STEAM COOLING APPARATUS FOR GAS TURBINE

(75) Inventors: Tomoka Tanaka, Takasago (JP); Koji Hiramoto, Takasago (JP); Yoshiyuki Kita, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 56 days.

(21) Appl. No.: 09/994,756

(22) Filed: Nov. 28, 2001

(65) Prior Publication Data

US 2002/0062639 A1 May 30, 2002

(30) Foreign Application Priority Data

Nov. 28, 2000 (JP) ......................................... 2000-360799
Nov. 28, 2000 (JP) ......................................... 2000-360800

(51) Int. Cl.[7] ............................... F02C 6/18; F02C 7/18
(52) U.S. Cl. ........................ 60/772; 60/39.182; 60/806
(58) Field of Search ............................ 60/772, 39.182, 60/806

(56) References Cited

U.S. PATENT DOCUMENTS 6,128,895 A * 10/2000 Takahama et al. ........ 60/39.182
6,223,518 B1 * 5/2001 Wada et al. ............. 60/39.182
6,422,022 B2 * 7/2002 Gorman et al. ................ 60/806

FOREIGN PATENT DOCUMENTS

| EP | 0928882 | * | 7/1999 |
| JP | 11-62515 | | 5/1999 |
| JP | 2001-73801 A | * | 3/2001 |

* cited by examiner

Primary Examiner—Ted Kim
(74) Attorney, Agent, or Firm—Oblon, Spivak, McClelland, Maier & Neustadt, P.C.

(57) ABSTRACT

An apparatus and method for steam cooling a gas turbine. An intermediate-pressure drum 106 of a recovery boiler supplies outlet steam, as a cooling steam, to a combustor 117 through a steam channel 116. The flow rate of steam guided into the combustor 117 is adjusted through opening or closing of a first flow control valve 120 by a controller 125 such that the pressure of the intermediate-pressure drum 106 becomes a set value set according to a load status of a gas turbine 101. A required amount of steam according to the load status of the gas turbine 101 is fed to the combustor 117. Thus, the flow rate of steam guided into the combustor 117 is controlled by adjustment of the existing first flow control valve 120 for maintaining the pressure of the intermediate-pressure drum 106 in a predetermined state, without the need to provide an expensive valve device in the steam channel 116.

13 Claims, 6 Drawing Sheets

STEAM COOLING APPARATUS FOR GAS TURBINE

CROSS REFERENCE TO RELATED APPLICATION

The entire disclosures of Japanese Patent Application Nos. 2000-360799 and 2000-360800 filed on Nov. 28, 2000, including specifications, claims, drawings and summaries are incorporated herein by reference in their entirety.

BACKGROUND OF THE INVENTION

1. Field of the Invention

The present invention relates to a steam cooling apparatus for a gas turbine. More particularly, the invention relates to cooling apparatus and methods of use.

2. Discussion of the Background

From the viewpoints of economy and effective use of energy resources, various measures for improving efficiency have been implemented in power generation facilities (power generation plants). One of the measures is the employment of a turbine power generation plant (a combined cycle power generation plant) in which a gas turbine and a steam turbine are combined. In the combined cycle power generation plant, high-temperature exhaust gas from the gas turbine is fed to the waste heat recovery boiler, in which steam is generated via a superheating unit, and the thus-generated steam is fed to the steam turbine, in which the generated steam performs work.

A high-temperature component, such as a combustor, of a gas turbine has been cooled with air. However, in order to cope with a recent increase in combustion temperature, cooling with steam has come into use. In relation to a combined cycle power generation plant as well, there is a plan to use a steam turbine in combination with a gas turbine in which a high-temperature component, such as a combustor, is cooled by steam, to thereby obtain a highly efficient power generation plant. For example, steam from a waste heat recovery boiler (intermediate-pressure steam) is bypassed to a combustor, and cooling steam is guided to the combustor, with the amount of the cooling steam being adjusted based on the temperature, pressure, etc. to supply a desired amount of cooling steam to the combustor. Steam after cooling is recovered to the steam turbine side. This configuration results in a combined cycle power generation plant in which a highly efficient cooling system has been constructed.

The present inventors realized that with a conventional steam cooling apparatus for a gas turbine, the amount of cooling steam to be supplied to the combustor is adjusted to feed a desired amount of cooling steam. Thus, the amount of cooling steam can be controlled to a preset flow rate. However, techniques capable of feeding the desired amount of steam to the combustor by a simple configuration have not been established. Furthermore, if the outlet temperature of the combustor is elevated because of any abnormality even when the amount of cooling steam is as set (i.e., if cooling does not take place as planned), the combustor is protected by an interlock function such as trip or runback. Thus, in the event of an increase in the outlet temperature of the combustor due to any abnormality, the efficiency of the entire plant lowers.

SUMMARY OF THE INVENTION

The present invention has been accomplished in view of the foregoing circumstances. An object of the present invention is to provide a steam cooling apparatus for a gas turbine which can supply a desired amount of cooling steam to a high-temperature component of the gas turbine, without installing a valve device, which directly adjusts the amount of steam, in an introduction system for cooling steam from a waste heat recovery boiler.

In order to achieve the above object, the present invention provides a steam cooling apparatus for a gas turbine, comprising: a waste heat recovery boiler for generating steam by use of exhaust gas of the gas turbine; a steam turbine operated by means of steam generated by the waste heat recovery boiler; a steam introduction passage for introducing steam from the waste heat recovery boiler into the steam turbine, a steam cooling passage provided in the steam introduction passage and adapted to bypass steam from the waste heat recovery boiler for cooling of a high-temperature component of the gas turbine; generated steam pressure detection means for detecting a pressure of steam generated by the waste heat recovery boiler; a generated steam pressure control valve for controlling a flow rate of steam in the steam introduction passage based on detection information from the generated steam pressure detection means in order to adjust the pressure of steam generated by the waste heat recovery boiler; post-cooling steam temperature detection means provided in the steam cooling passage on a downstream side of the high-temperature component and adapted to detect a temperature of steam after cooling the high-temperature component; and control means which performs open/close control of the generated steam pressure control valve so that a detection value of the generated steam pressure detection means becomes a set value in order to adjust a flow rate of steam flowing into the steam cooling passage based on a state of the gas turbine, and which performs open/close control of the generated steam pressure control valve in order to adjust the flow rate of steam flowing into the steam cooling passage based on detection information from the post-cooling steam temperature detection means.

According to this feature, the flow rate of steam guided into the high-temperature component can be properly controlled by control of the generated steam pressure control valve for maintaining in a predetermined state the pressure of steam generated by the waste heat recovery boiler, without the need to provide the steam cooling passage with an expensive valve device. Moreover, if the steam temperature after cooling rises, control for increasing the flow rate of steam guided into the high-temperature component is performed, making protection of the high-temperature component possible. As a result, an increase in the construction cost of the combined cycle power generation plant can be suppressed, and damage to the high-temperature component, and so forth can be prevented.

The steam cooling passage may branch off from the steam introduction passage ranging from an intermediate-pressure drum to an intermediate-pressure steam turbine: an intermediate-pressure drum pressure control valve may be provided in the steam introduction passage on a downstream side of a branching portion of the steam cooling passage to serve as the generated steam pressure control valve; and the control means may have a function of performing open/close control of the intermediate-pressure drum pressure control valve so as to secure the flow rate in the steam cooling passage by restricting the flow rate in the steam introduction passage based on the detection information from the post-cooling steam temperature detection means.

According to this feature, steam from the intermediate-pressure drum may be fed to the steam cooling passage.

An auxiliary steam introduction passage into which steam from a high-pressure drum is introduced may be connected to the steam cooling passage; an auxiliary steam pressure control valve may be provided in the auxiliary steam introduction passage to serve as the generated steam pressure control valve; and the control means may have a function of performing open/close control of the auxiliary steam pressure control valve so as to secure the flow rate in the steam cooling passage by controlling the flow rate in the auxiliary steam introduction passage based on the detection information from the post-cooling steam temperature detection means.

According to this feature, steam from the high-pressure drum may be fed to the steam cooling.

An auxiliary steam introduction passage into which steam from a high-pressure drum is introduced may be connected to the steam cooling passage; an auxiliary fluid channel may be connected to the auxiliary steam introduction passage; auxiliary steam temperature detection means for detecting a temperature of auxiliary steam may be provided in the auxiliary steam introduction passage on a downstream side of a merging portion of the auxiliary steam introduction passage; an auxiliary fluid pressure control valve may be provided in the auxiliary fluid channel to serve as the generated steam pressure control valve; and the control means may have a function of performing open/close control of the auxiliary steam pressure control valve so as to secure the flow rate in the steam cooling passage by controlling the flow rate in the auxiliary fluid channel based on the detection information from the post-cooling steam temperature detection means and detection information from the auxiliary steam temperature detection means.

According to this feature, steam from the high-pressure drum and auxiliary steam may be fed to the steam cooling passage.

The steam cooling passage may branch off from the steam introduction passage ranging from an intermediate-pressure drum to an intermediate-pressure steam turbine; an auxiliary steam introduction passage into which steam from a high-pressure drum is introduced may be connected to the steam cooling passage: an intermediate-pressure drum pressure control valve may be provided in the steam introduction passage on a downstream side of a branching portion of the steam cooling passage to serve as the generated steam pressure control valve; an auxiliary steam pressure control valve may be provided in the auxiliary steam introduction passage to serve as the generated steam pressure control valve; and the control means may have functions of performing open/close control of the intermediate-pressure drum pressure control valve so as to secure the flow rate in the steam cooling passage by restricting the flow rate in the steam introduction passage based on the detection information from the post-cooling steam temperature detection means, and performing open/close control of the auxiliary steam pressure control valve so as to secure the flow rate in the steam cooling passage by controlling the flow rate in the auxiliary steam introduction passage based on the detection information from the post-cooling steam temperature detection means.

According to this feature, steam from the intermediate-pressure drum, and steam from the high-pressure drum and auxiliary steam may be fed to the steam cooling passage.

The present invention has also been accomplished in view of the above circumstances. Another object of the present invention is to provide a steam cooling apparatus for a gas turbine which can protect a high-temperature component, without using an interlock function, even if the temperature on the outlet side of the high-temperature component increases.

In order to achieve the above object, the present invention provides a steam cooling apparatus for a gas turbine, comprising; a waste heat recovery boiler for generating steam by use of exhaust gas of the gas turbine; a steam turbine operated by means of steam generated by the waste heat recovery boiler: a steam introduction passage for introducing steam from the waste heat recovery boiler into the steam turbine; a steam cooling passage provided in the steam introduction passage and adapted to bypass steam from the waste heat recovery boiler for cooling of a high-temperature component of the gas turbine; a steam amount control valve provided in the steam cooling passage and adapted to control an amount of steam introduced into the steam cooling passage; post-cooling steam temperature detection means provided In the steam cooling passage on a downstream side of the high-temperature component and adapted to detect a temperature of steam after cooling the high-temperature component; and control means which performs open/close control of the steam amount control valve in order to adjust a flow rate of steam flowing into the steam cooling passage based on detection information from the post-cooling steam temperature detection means, and which controls the flow rate of steam flowing into the steam cooling passage to a predetermined state.

According to this feature, if the steam temperature after cooling rises, the steam amount control valve is controlled so as to increase the flow rate of steam guided into the high-temperature component. As a result, the amount of cooling steam is increased to make protection of the high-temperature component possible. Consequently, the high-temperature component can be protected, without using an interlock function, even if the temperature on the outlet side of the high-temperature component increases. Thus, damage to the high-temperature component, and so forth can be prevented.

The steam cooling apparatus for a gas turbine according to the present invention also comprises: a waste heat recovery boiler for generating steam by use of exhaust gas of the gas turbine; a steam turbine operated by means of steam generated by the waste heat recovery boiler; a steam introduction passage for introducing steam from the waste heat recovery boiler into the steam turbine; a steam cooling passage provided in the steam introduction passage and adapted to bypass steam from the waste heat recovery boiler for cooling of a high-temperature component of the gas turbine; generated steam pressure detection means for detecting a pressure of steam generated by the waste beat recovery boiler; a generated steam pressure control valve for controlling a flow rate of steam in the steam introduction passage based on detection information from the generated steam pressure detection means in order to adjust the pressure of steam generated by the waste heat recovery boilers a steam amount control valve provided in the steam cooling passage and adapted to control an amount of steam introduced into the steam cooling passage, post-cooling steam temperature detection means provided in the steam cooling passage on a downstream side of the high-temperature component and adapted to detect a temperature of steam after cooling the high-temperature component: and control means which performs open/close control of the generated steam pressure control valve so that a detection value of the generated steam pressure detection means becomes a set value in order to adjust a flow rate of steam flowing into the steam cooling passage based on a state of the gas turbine, and which performs open/close control of the generated steam pressure control valve and the steam amount control valve in order to adjust the flow rate of steam flowing into the steam cooling passage based on detection information from the post-cooling steam temperature detection means.

According to this feature, if the steam temperature after cooling rises, the generated steam pressure control valve and the steam amount control valve are controlled so as to increase the flow rate of steam guided into the high-temperature component. As a result, the amount of cooling steam is increased to make protection of the high-temperature component possible. Consequently, the high-temperature component can be protected, without using an interlock function even if the temperature on the outlet side of the high-temperature component increases. Thus, damage to the high-temperature component, and so forth is prevented.

The steam cooling passage may branch off from the steam introduction passage ranging from an intermediate-pressure drum to an intermediate-pressure steam turbine; an intermediate-pressure drum pressure control valve may be provided in the steam introduction passage on a downstream side of a branching portion of the steam cooling passage to serve as the generated steam pressure control valve; and the control means may have a function of performing open/close control of the intermediate-pressure drum pressure control valve so as to secure the flow rate in the steam cooling passage by restricting the flow rate in the steam introduction passage based on the detection information from the post-cooling steam temperature detection means.

According to this feature, steam from the intermediate-pressure drum can be fed to the steam cooling passage.

An auxiliary steam introduction passage into which steam from a high-pressure drum is Introduced may be connected to the steam cooling passage: an auxiliary steam pressure control valve may be provided in the auxiliary steam introduction passage to serve as the generated steam pressure control valve; and the control means may have a function of performing open/close Control of the auxiliary steam pressure control Valve so as to secure the flow rate in the steam cooling passage by controlling the flow rate in the auxiliary steam introduction passage based on the detection information from the post-cooling steam temperature detection means.

According to this feature, steam from the high-pressure drum can be fed to the steam cooling passage.

The steam cooling passage may branch off from the steam introduction passage ranging from an intermediate-pressure drum to an intermediate-pressure steam turbine; an auxiliary steam introduction passage into which steam from a high-pressure drum is introduced may be connected to the steam cooling passage; an intermediate-pressure drum pressure control valve may be provided in the steam introduction passage on a downstream side of a branching portion of the steam, cooling passage to serve as the generated steam pressure control valve; an auxiliary steam pressure control valve may be provided in the auxiliary steam introduction passage to serve as the generated steam pressure control valve; and the control means may have functions of performing open/close control of the intermediate-pressure drum pressure control valve so as to secure the flow rate in the steam cooling passage by restricting the flow rate in the steam introduction passage based on the detection information from the post-cooling steam temperature detection means, and performing open/close control of the auxiliary steam pressure control valve so as to secure the flow rate in the steam cooling passage by controlling the flow rate, in the auxiliary steam introduction passage based on the detection information from the post-cooling steam temperature detection means.

According to this feature, steam from the intermediate-pressure drum, steam from the high-pressure drum and auxiliary steam can be fad to the steam cooling passage.

The control means may also have a function of fully opening the steam amount control valve when the post-cooling steam temperature detection means detects that the steam temperature exceeds an upper limit.

According to this feature, when the steam temperature exceeds the upper limit, the maximum amount of steam can be passed through the steam cooling passage.

DESCRIPTION OF THE PREFERRED EMBODIMENTS

The present invention will be described in greater detail with reference to the accompanying drawings.

Figure 1:
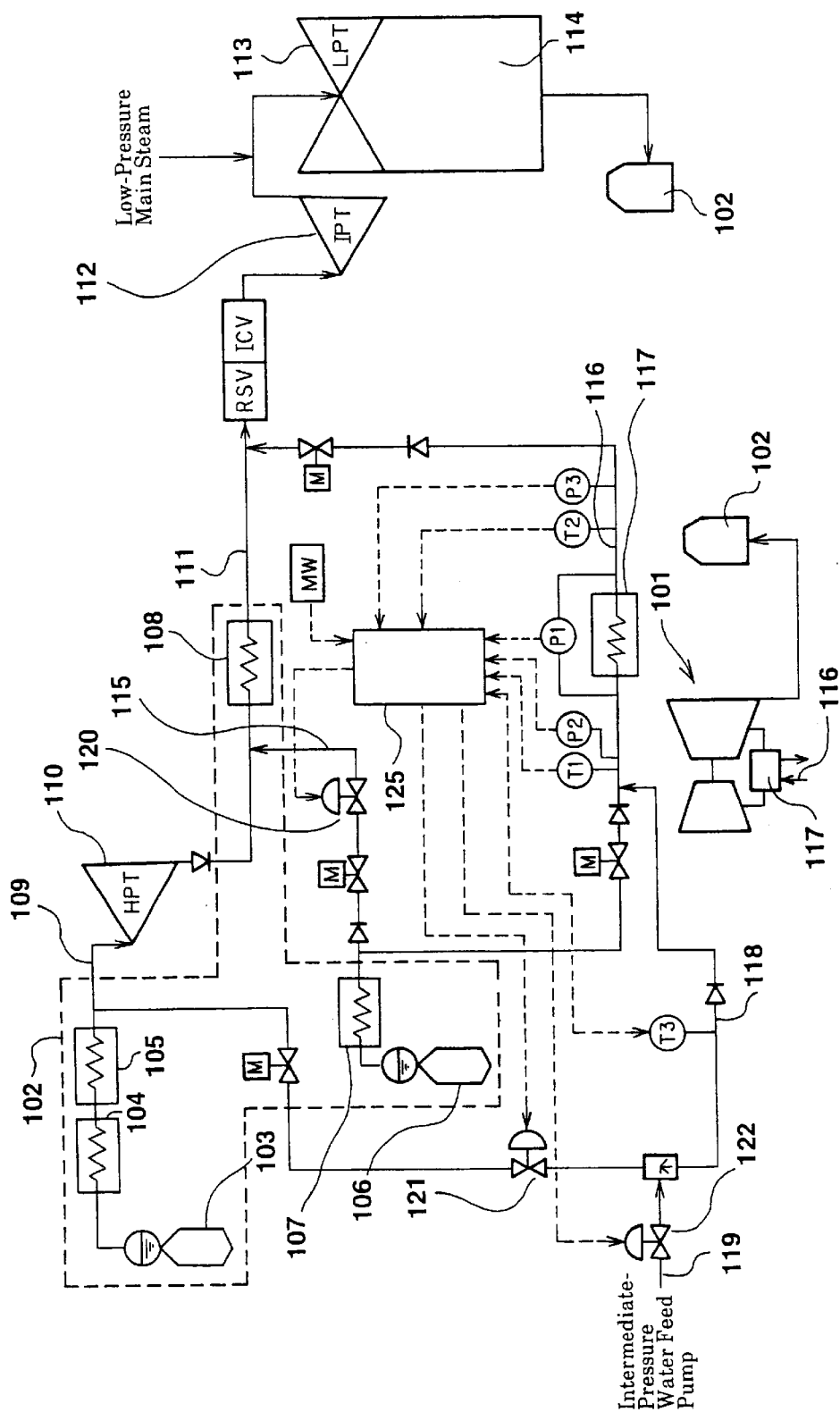
FIG. 1 is a schematic configuration diagram Showing a cooling system of a combined cycle power generation plant equipped with a steam cooling apparatus for a gas turbine according to a first embodiment of the present invention.
Figure 2:
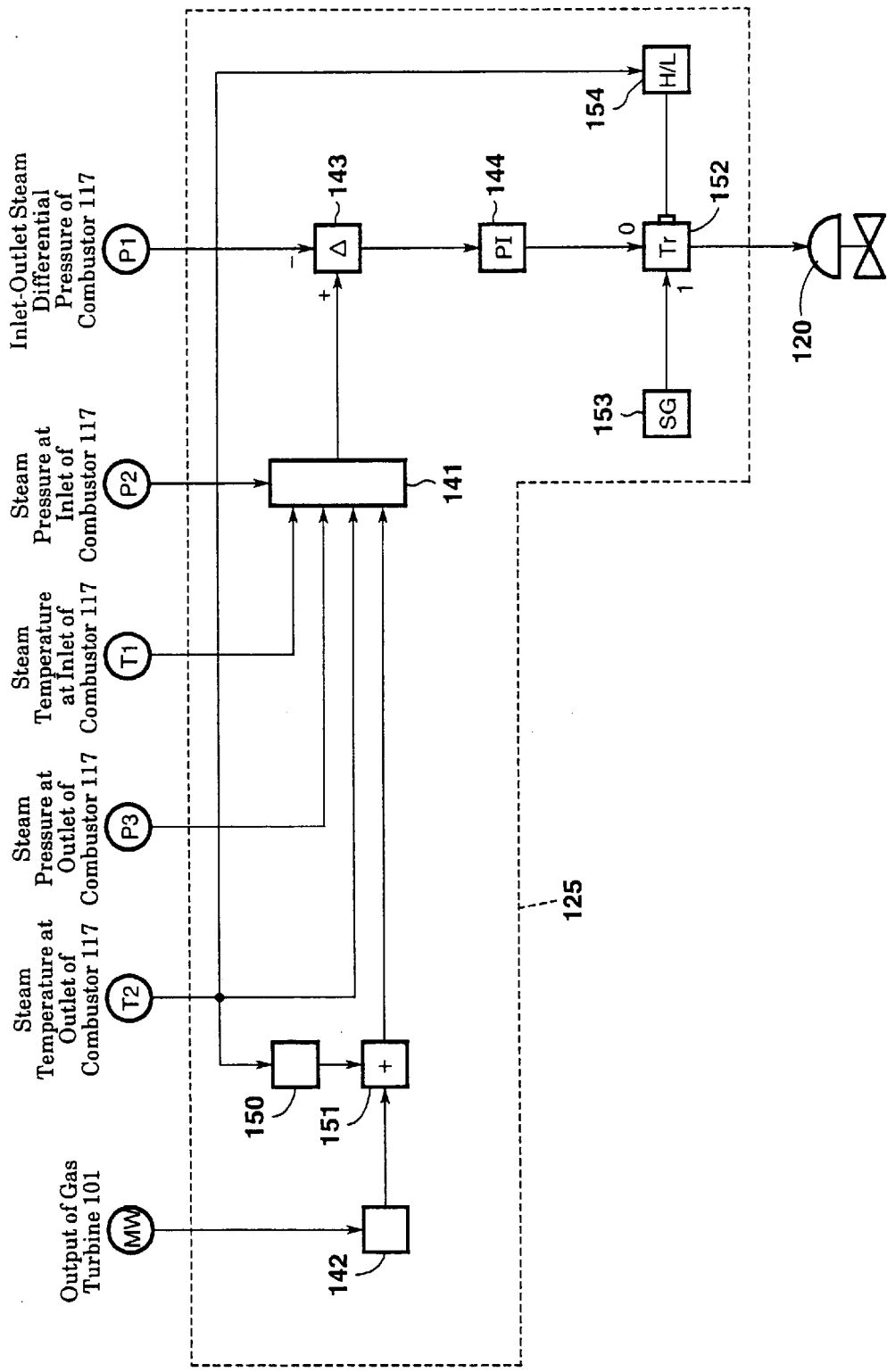
FIG. 2 is a control block diagram of a first flow control valve.
Figure 3:
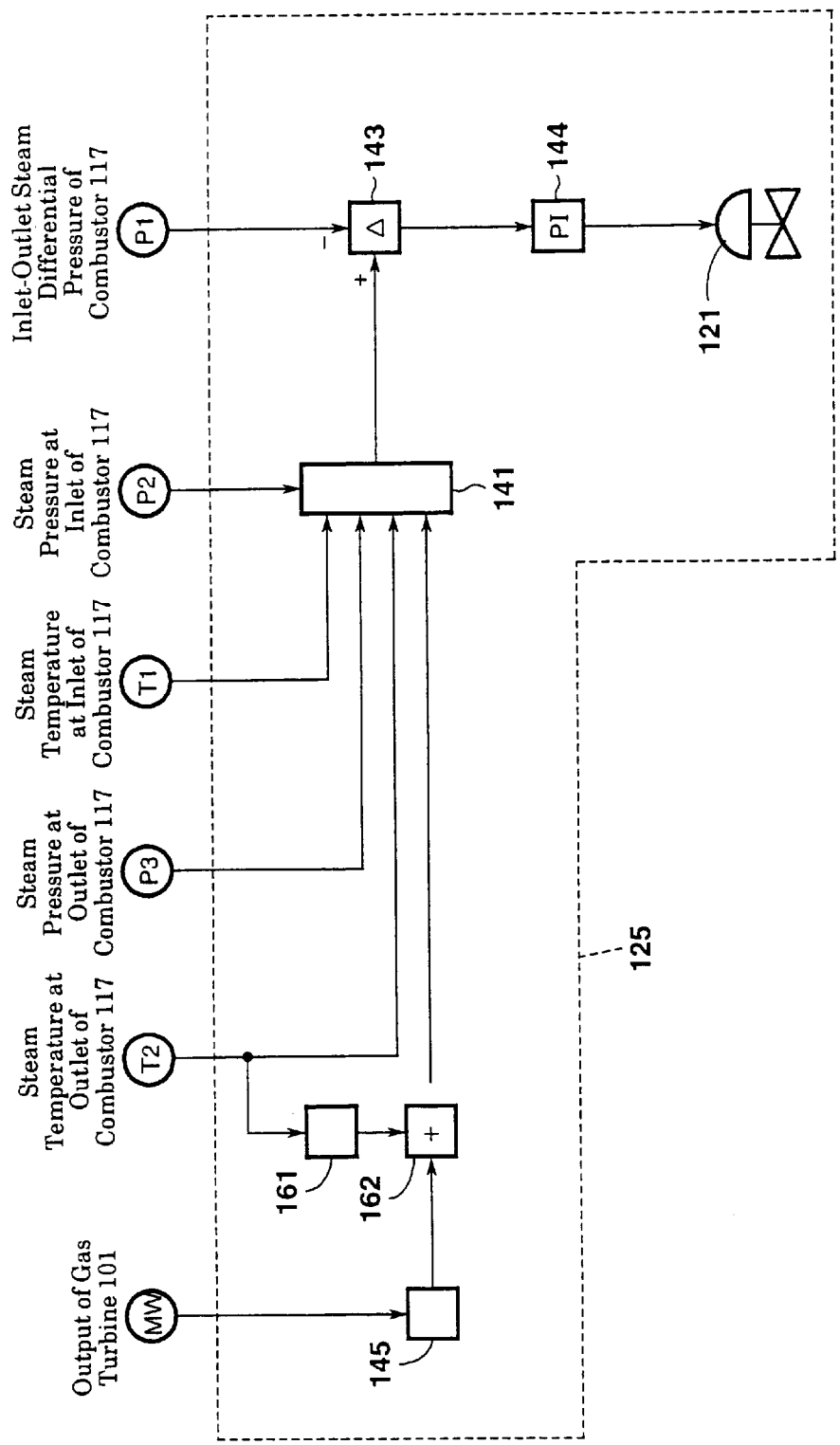
FIG. 3 is a control block diagram of a second flow control valve.

A first embodiment of the present invention to described based on FIGS. 1 to 3.

As shown in FIG. 1, exhaust gas from a gas turbine 101 is fed to a waste heat recovery boiler 102. In the waste heat recovery boiler 102, a high-pressure drum 103, a first high-pressure superheater 104, and a second high-pressure superheater 105 are provided, and an intermediate-pressure drum 106, an intermediate-pressure superheater 107, and a reheater 108 are also provided. Steam generated in the high-pressure drum 103 is fed through a high-pressure-side steam Introduction passage 109 to a high-pressure steam turbine 110 via the first high-pressure superheater 104 and the second high-pressure superheater 105. Steam discharged from the high-pressure steam turbine 110 is fed through a steam introduction passage 111 to an intermediate-pressure steam turbine 112 via the reheater 108. Steam discharged from the intermediate-pressure steam turbine 112 is fed to a low-pressure steam turbine 113 and is then condensed by a condenser 114; and the produced condensate is collected to the waste heat recovery boiler 102. Meanwhile, steam generated in the intermediate-pressure drum 106 is fed through an intermediate-pressure-side steam introduction passage 115, as a steam introduction passage, to the intermediate-pressure steam turbine 112 via the intermediate-pressure superheater 107 and the reheater 108.

A steam channel 116, as a steam cooling passage, branches off from the intermediate-pressure-side steam introduction passage 115. The steam channel 116 serves as a bypass via a Combustor 117, which is a high-temperature component of the gas turbine 201, and merges into the steam introduction passage 111 on the inlet side of the intermediate-pressure steam turbine 112. Further, a high-pressure steam channel 118 branches off from the high-pressure-side steam introduction passage 109 on the downstream side of the second high-pressure superheater 105. The high-pressure steam channel 118 merges into the steam channel 116 on the upstream side of the gas turbine 101. An auxiliary fluid channel 119 into which water is introduced from an intermediate-pressure water feed pump merges into the high-pressure steam channel 118.

A first flow control valve 120 (intermediate-pressure drum pressure control valve), as a generated steam pressure control valve, is disposed in the intermediate-pressure-side steam introduction passage 115 on the downstream side of the branching portion where the steam channel 116 branches off from the intermediate-pressure-side steam introduction passage 115. The flow rate of steam which flows through the intermediate-pressure-side steam introduction passage 115 (steam pressure in the intermediate-pressure drum 106) is adjusted by opening and closing of the first flow control valve 120. A second flow control valve 121 (auxiliary steam pressure control valve), as a generated steam pressure control valve, is disposed in the high-pressure steam channel 118 on the upstream side of the merging portion of the auxiliary fluid channel 119. The flow rate of High-pressure steam introduced from the high-pressure steam channel 118 into the steam channel 116 is adjusted by opening and closing of the second flow control valve 121, Thus, the temperature of steam in the steam channel 116 is adjusted moreover, a third flow control valve 122 (auxiliary fluid pressure control valve), as a generated steam pressure control valve, is disposed in the auxiliary fluid channel 119. A proper amount of intermediate-pressure feed water is introduced into the high-pressure steam channel 118 by opening and closing of the third flow control valve 122 to thereby lower the temperature of steam within the high-pressure steam channel 11, whereby the temperature of high-pressure steam introduced into the steam channel 116 is controlled to a predetermined temperature.

Temperature detection means T1 is connected to the steam channel 116 at a site between the gas turbine 101 and the merging portion of the high-pressure steam channel 118. The temperature detection means T1 detects the temperature of steam to be introduced into the gas turbine 101. Differential-pressure detection means P1 is connected to the steam channel 116 so as to detect a difference in steam pressure between the inlet side and the outlet side of the combustor 117 to thereby detect the differential pressure, i.e., flow rate, of steam flowing through the combustor 117. Second temperature detection means T3, as auxiliary steam temperature detection means, is connected to the high-pressure steam channel 118 on the downstream aide of the merging portion of the auxiliary fluid channel 119. The second temperature detection means T3 detects the temperature of steam within the high-pressure steam channel 118. In FIG. 1, the reference character P2 denotes inlet-pressure detection means for detecting the pressure of steam within the steam channel 116 on the inlet side of the combustor 117; P3 denotes outlet-pressure detection means for detecting the pressure of steam within the steam channel 116 on the outlet side of the combustor 117; and T2 denotes outlet-temperature detection means, as post-cooling steam temperature detection means for detecting the temperature of steam within the steam channel 116 on the outlet side of the combustor 117.

Detection information from the temperature detection means T1, the differential-pressure detection means P1, the second temperature detection means T3, and detection information from the inlet-pressure detection means P2, the outlet-pressure detection means P3, and the outlet-temperature detection means T2 are entered into control means 125. Further, an output of the gas turbine 101 (MW) is inputted into the control means 125. The control means 125 outputs open/close commands to the first flow control valve 120, the second flow control valve 121, and the third flow control valve 122.

Responsive to the detection information (differential pressure) from the differential-pressure detection means P1 the first flow control valve 120 is opened or closed to regulate the flow of steam to the intermediate-pressure steam turbine 112, whereby the flow rate of steam flowing through the combustor 117 is controlled properly. Responsive to the detection information from the differential-pressure detection means P1 and the temperature detection means T1, the second flow control valve 121 is opened or closed, and based on the detection information from the second temperature detection means T3, the third flow control valve 122 is opened or closed, whereby the amount of steam flowing through the combustor 117 is controlled properly, while a proper flow rate is maintained on this occasion, if the temperature of steam rises because of any abnormality even when the amount of steam flowing through the combustor 117 is maintained at a proper level, for example, if the combustor 117 is not cooled as planned, the first flow control valve 120, the second flow control valve 121, and the third flow control valve 122 are opened or closed based on the detection information from the outlet-temperature detection means T2. As a result, the amount of steam flowing through the steam channel 116 is increased to prevent an excessive Increase in the temperature of steam flowing through the combustor 117.

Specifically, in the control means 125, a flow rats of cooling steam which the combustor 117 requires is calculated; a differential pressure corresponding to the required flow rate of cooling steam is calculated; and an open/close command is outputted to the first flow control valve 120 such that the differential pressure detected by the differential-pressure detection means P1 becomes equal to the calculated differential pressure. Thus, cooling steam at the required flow rate is supplied to the combustor 117. Further, in the control means 125, a steam temperature which the gas turbine 101 requires is calculated; and an open/close command is outputted to the second flow control valve 121 such that the temperature detected by the temperature detection means T1 becomes equal to the calculated temperature. Simultaneously, in the control means 125, on the basis of the temperature of steam introduced into the steam channel 116 (detection information from the second temperature detection means T3 and detection information from the temperature detection means T1), an open/close command is outputted to the third flow control valve 122, whereby the flow rate of intermediate-pressure feed water may be controlled properly, and the temperature of steam within the high-pressure steam channel 118 is lowered to a predetermined temperature.

When the flow rats of steam flowing through the combustor 117 increases or decreases as a result of temperature control, the first flow control valve 120 is opened or closed on the basis of the detection information from the differential-pressure detection means P1, so that the predetermined steam flow rate is secured. When a delay is produced in generation of intermediate-pressure steam due to a variation in load or other cause and the absolute flow rate of steam flowing through the steam channel 116 becomes insufficient, backup control is performed preferentially over temperature control. In backup control, the second flow control valve 121 is opened or closed such that the differential pressure detected by the differential-pressure detection means P1 becomes equal to the calculated differential pressure, to thereby introduce high-pressure steam. Thus, a required steam flow rate is secured. That is, even in differential-pressure control, an open/close command is outputted to the second flow control valve 121, and the opening of the second flow control valve 121 is controlled on the basis of a higher of the value of an opening command outputted by means of temperature control and the value of an opening command outputted by means of differential-pressure control.

In the above-described steam cooling apparatus, low-temperature steam generated in the intermediate-pressure drum 106 and high-temperature steam generated in the high-pressure drum 103 are mixed, and the mixed steam is introduced into the combustor 117, while the flow rate and the temperature of the mixed steam are controlled properly. In order to optimize the mixing, the steam flow rate is controlled through opening and closing of the first flow control valve 120 provided in the intermediate-pressure-side steam introduction passage 115, and the flow rate of high-pressure steam is controlled through opening and closing of the second flow control valve 121 provided in the high-pressure steam channel 118 to thereby control the steam temperature. Further, when the intermediate-pressure steam becomes insufficient, backup control opens the second flow control valve 121 in order to supply high-pressure steam to thereby secure the required flow rate. Thus, it becomes possible to control the flow rate of steam guided into the combustor 117 further properly, without providing the steam channel 116 with an expensive valve device.

The control status of the first flow control valve 120 and the second flow control valve 121 will be described in detail based on FIGS. 2 and 3.

As shown in FIG. 2, detection information from the temperature detection means T1, the inlet-pressure detection means P2, the outlet-pressure detection means P3, and the outlet-temperature detection means T2 is inputted to computation means 141 of the control means 1253 Further, the output MW of the gas turbine 101 is inputted to conversion computation means 142, which converts the output MW to a required flow rate of backup steam, which is then inputted to addition means 151. A bias corresponding to temperature is calculated by function means 150 based on detection information from the outlet temperature detection means T2. A bias value considered responsive to temperature is added to the output MW of the gas turbine 101 by the addition means 151. Information on the sum of the output MW of the gas turbine 101 and the bias value is inputted to the conversion computation means 142. In the conversion computation means 142, the output MW having the bias value added thereto is converted to a required flow rate of cooling steam, and is inputted to the computation means 141.

The bias value is set such that the required flow rate of cooling steam increases as the steam temperature detected by the output-temperature detection means T2 increases. That is, control is performed such that as the steam temperature, detected by the output-temperature detection means T2, increases, the first flow control valve 120 is decreased in opening, thereby increasing the flow rate of steam fed to the steam channel 116. The computation means 141 converts the inputted information to a value corresponding to the differential pressure, and outputs this value to addition means 143. The addition means 143 also receives detection information from the differential pressure detection means P1. The addition means 143 calculates the difference between the information on the value corresponding to the differential pressure outputted from the computation means 141 and the detection information outputted from the differential pressure detection means P1. PI computation means 144 calculates an "opening command", indicative of adjusting the first flow control valve 120 a determined open amount, from the obtained difference, and outputs the opening command to the input 0 of selection means 152. A "full-close command", indicative of adjusting the first flow control valve 120 a determined closed amount, is supplied from command means 153 to the input 1 of the selection means 152. For example, a full-close command may permit a minimum opening of about 3% to about 5% opening.

In an ordinary state, the selection means 152 is maintained "off" and enters an "on" state upon reception of a command from comparison means 154. That is, when the selection means 152 enters the on state, the command fed to the input 1 is outputted as an output command, in place of the command fed to the input 0. When the selection means 152 Is in the off state, the opening command fad to the input 0 (the opening command corresponding to the output MW of the gas turbine 101 and the status of the steam channel 116) is outputted to the first flow control valve 120. When the selection means 152 is in the on state, the opening command fed to the input 1 (the full-close command) is outputted to the first flow control valve 120. Detection information outputted from the outlet-temperature detection means T2 is inputted to the comparison means 154, which outputs the result of comparison to the selection means 152. When the comparison means 154 determines that the temperature detected by the outlet-temperature detection means T2 is higher than a predetermined value (or upper limit), the comparison means 154 outputs an on signal to the selection means 152 which selects the opening command fed to the input 1.

Accordingly, the first flow control valve 120 is opened and closed on the basis of the output MW of the gas turbine 101 and the status of the steam channel 116 in such a manner that the flow rate of steam flowing through the steam channel 116 attains a predetermined level. Further, when the temperature of steam on the outlet side of the combustor 117 detected by the outlet-temperature detection means T2 increases, the first flow control valve 120 is controlled such that its opening decreases. Thus, the flow rate of steam flowing through the steam channel 116 is increased to accommodate the increase in temperature. Moreover, when the temperature detected by the outlet-temperature detection means T2 exceeds the predetermined value (or upper limit), the first flow control valve 120 is closed fully by means of the full-close command (or minimum opening command), so that all of steam from the intermediate-pressure drum 106 is fed to the steam channel 116.

As shown in FIG. 3, detection information from the temperature detection means T1, the inlet-pressure detection means P2, the outlet-pressure detection means P3, and the outlet-temperature detection means T2 are inputted to computation means 141 of the control means 125. Further, the output MW of the gas turbine 101 is inputted to second conversion computation means 145, which converts the output MW to a required flow rate of backup steam, and is then inputted to addition means 162. A bias corresponding to temperature is computed by function means 161 based on detection information from the outlet-temperature detection means T2. A bias value, responsive to temperature, is added to the output MW of the gas turbine 101 by the addition means 162. Information on the sum of the output MW of the gas turbine 101 and the bias value is inputted to the computation means 141. In the second conversion computation means 145, the sum of the output MW and the bias value is converted to a required flow rate of cooling steam, which is inputted to the computation means 141.

The computation means 141 converts the inputted information to a value corresponding to the differential pressure, and outputs this value to addition means 143. The addition means 143 also receives detection information from the differential pressure detection means P1. The addition means 143 calculates the difference between the information on the value corresponding to the differential pressure outputted from the computation mean 141 and the detection information outputted from the differential pressure detection means P1. PI computation means 144 calculates an opening command from the obtained difference.

The bias value is set such that the required flow rate of cooling steam increases with the steam temperature detected by the output-temperature detection means T2. That is, control is performed such that as the steam temperature detected by the output-temperature detection means T2 increases, the opening of the second flow control valve 121 is increased, thereby increasing the flow rate of steam fed from the high-pressure steam channel 118 to the steam channel 116.

Accordingly, the second flow control valve 121 is opened and closed on the basis of the output MW of the gas turbine 101 and the detected status of the steam channel 116 in such a manner that the flow rate of steam flowing through the steam channel 116 attains a predetermined level. Further, when the temperature of steam on the outlet side of the combustor 117 detected by the outlet-temperature detection means T2 increases, the second flow control valve 121 is opened to increase the flow rate of steam flowing through the steam channel 116 based on the increase in temperature.

Therefore, when the temperature of steam on the outlet side of the combustor 117 increases, the flow rate of cooling steam is increased as the steam temperature detected by the outlet-temperature detection means T2 Increases. When the temperature detected by the outlet-temperature detection means T2 exceeds the predetermined value (or upper limit), steam from the intermediate-pressure drum 106 Is fed to the steam channel 116 to increase the flow rate of cooling steam. This operation enables protection of the combustor 117 when the temperature of cooling steam increases even if the flow rate of cooling steam is controlled to a predetermined level.

When the outlet temperature of the combustor 117 increases, the control for opening and closing the first flow control valve 120 and second flow control valve 121 is performed. For example, the first flow control valve 120 is closed in order to feed steam from the intermediate-pressure drum 106 to the steam channel 116, and if the outlet temperature of the combustor 117 remains high even after the first flow control valve 120 Is fully closed, the second flow control valve 121 is opened to increase the flow rate of steam fed from the high-pressure steam channel 118. It should be appreciated that the control for opening and closing the first flow control valve 120 and the second flow control valve 121 is properly designed in accordance with the capacity of the facility and other factors, and is performed in combination with opening and closing of other control valves to simultaneously obtain a predetermined flow rate and a predetermined temperature.

A second embodiment of the present invention will be described based on FIGS. 4 and 5. The structure disclosed in FIGS. 1 to 3 contain elements which are described with reference to FIGS. 4 and 5. The same elements indicated in FIGS. 4 and 5 as in FIGS. 1 to 3 are assigned the same numerals and characters, and duplicate explanations are omitted.

Figure 4:
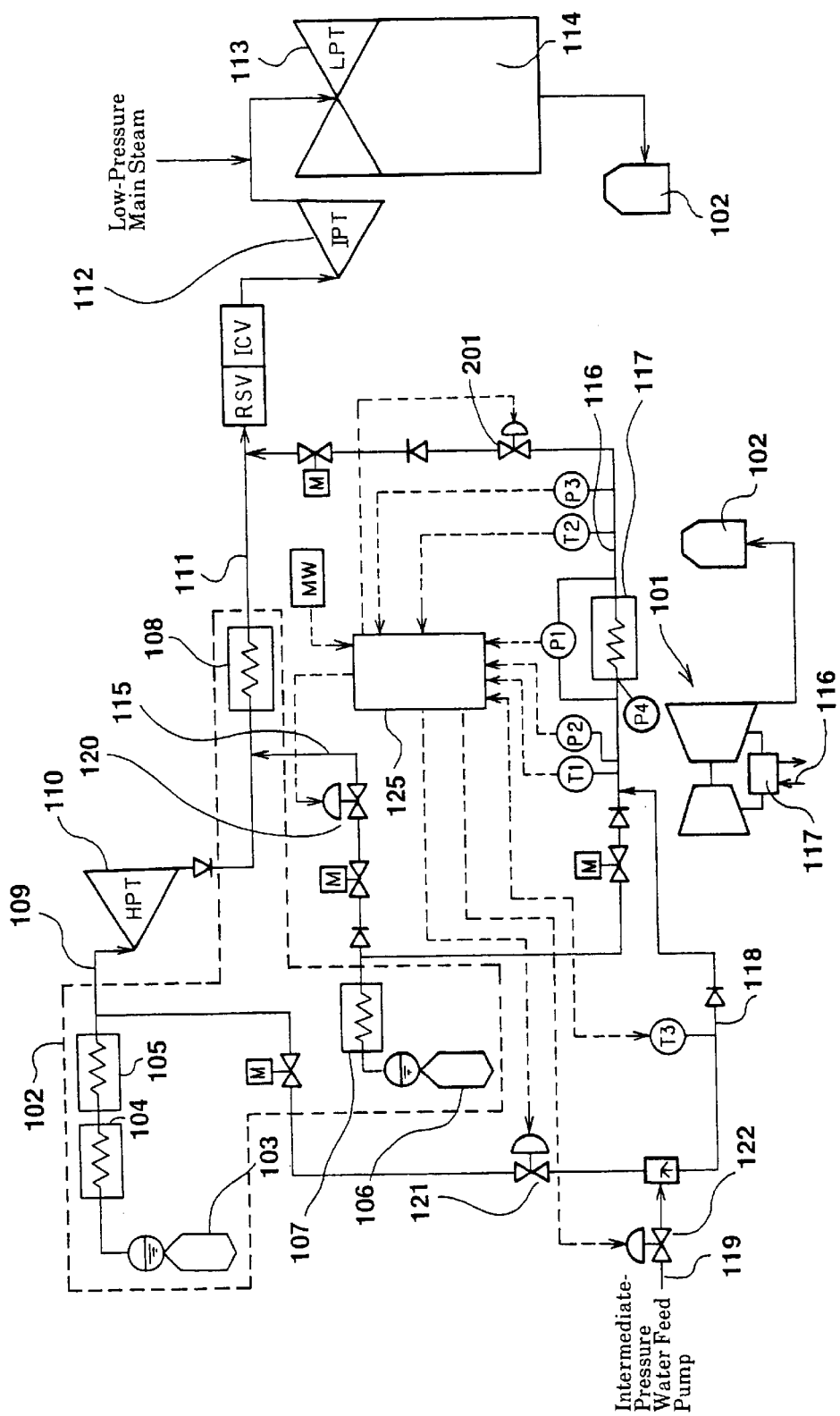
FIG. 4 is a schematic configuration diagram showing a cooling system of a combined cycle power generation plant equipped with a steam cooling apparatus for a gas turbine according to a second embodiment of the present invention.

As shown in FIG. 4, a steam amount control valve 201 is provided in a steam channel 116 on the outlet side of a combustor 117, and the flow rate of steam flowing through the steam channel 116 is controlled through opening and closing the steam amount control valve 201. The steam amount control valve 201 may be provided in the steam channel 116 on the inlet side of the combustor 117, Casing-pressure detection means P4 for detecting the casing pressure of the combustor 117 is provided on the inlet side of the combustor 117. Detection information from the casing-pressure detection means P4 is inputted to control means 125, which outputs open/close commands to the Steam amount control valve 201. On the basis of the detection information from the casing-pressure detection means P4, the control means 125 opens or closes the steam amount control valve 201, whereby the flow rate of steam flowing through the combustor 117 Is controlled properly.

When the steam temperature increases due to a certain anomalous state even through the flow rate of steam flowing through the combustor 117 is maintained at a proper level (i.e., when the combustor 117 is not cooled as planned), the steam amount control valve 201 is opened or closed according to the detection information from the outlet-temperature detection means T2. For example, increasing the flow rate of steam flowing through the steam channel 116, thereby preventing the excessive increase of the temperature of steam flowing through the combustor 117, is desired. Furthermore, the control means 125 outputs an open/close command to the steam amount control valve 201 in accordance with the casing pressure of the combustor 117. Thus, the steam amount control valve 201 is opened or closed in accordance with the casing pressure of the combustor 117. Accordingly, the flow rate of steam flowing through the steam channel 116 is controlled.

The status of controlling the steam amount control valve 201 will be described in detail with reference to FIG. 5. The control status of the first flow control valve 120 and the second flow control valve 121 is as illustrated in FIGS. 2 and 3.

Figure 5:
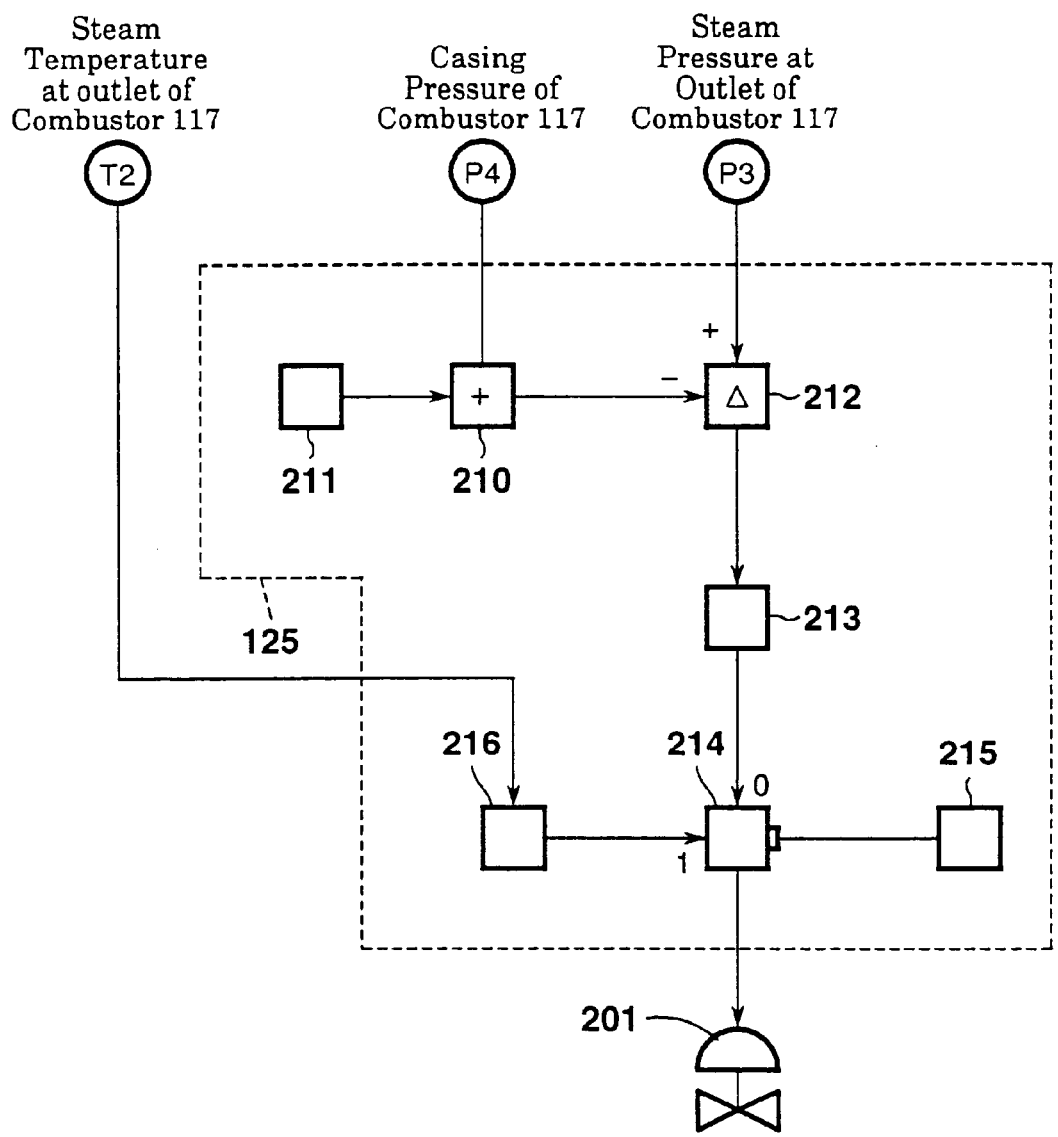
FIG. 5 is a control block diagram of a steam amount control valve.

As shown in FIG. 5, command information from command means 211 and detection information from the casing-pressure detection means P4 are inputted to addition means 210 of the control means 125. Information from the addition means 210 is then fed to addition means 212. The addition means 212 adds the information from the addition means 210 and detection information from the outlet-pressure detection means P3. Based on the results obtained, PI computation means 213 calculates an opening command for the steam amount control valve 201. The PI computation means 213 outputs the opening command to the input 0 of selection means 214. A full-open command is supplied from command means 215 to the input 1 of the selection means 214.

In an ordinary state, the selection means 214 is maintained off and enters an on state upon reception of a command from comparison means 216. That is, when the selection-means 214 enters the on state, the command fed to the input 1 is outputted as an output command in place of the command fed to the input 0. When the selection means 214 is in the off state, the opening command fed to the input 0 (the opening command corresponding to the casing pressure and the pressure on the outlet side of the combustor 117) is outputted to the steam amount control valve 201. When the selection means 214 is in the on state, the opening command fed to the input 1 (the full-open command) Is outputted to the steam amount control valve 201. Detection information from the outlet-temperature detection means T2 is inputted, to the comparison means 216, which outputs the result of comparison to the selection means 214. When the comparison means 216 determines that the temperature detected by the outlet-temperature detection means T2 is higher than a predetermined value (or upper limit), the comparison means 216 outputs an on signal to the selection means 214, so that the selection means 214 selects the opening command fed to the input 1.

Accordingly, when the temperature of steam on the outlet side of the combustor 117 increases and the steam temperature detected by the outlet-temperature detection means T2 exceeds the predetermined value (or upper limit), the steam amount control valve 201 is opened fully in order to increase the flow rate of cooling steam. Also, this control allows the flow rate of cooling steam to increase also in the case in which the temperature of cooling steam increases and exceeds the predetermined value (or upper limit) despite the flow rate of cooling steam which is controlled to a predetermined level.

Therefore, when the temperature of cooling steam supplied to the combustor 117 increases because of any abnormality, and therefore poses the risk of damage, the flow rate of cooling steam fed to the combustor 117 is increased. Thus, protection of the combustor 117 is possible. The steam cooling apparatus protects the combustor 117, without using an interlock function, even when the temperature on the outlet side of the combustor 117 increases.

The control for opening and closing the steam amount control valve 201 may be performed such that before the outlet-side temperature of the combustor 117 exceeds the predetermined value (upper limit), the steam amount control valve 201 is properly opened or closed according to the increased temperature, and when the predetermined value (upper limit) is exceeded, the steam amount control valve 201 is fully opened.

A third embodiment of the present invention will be described with reference to FIG. 6.

Figure 6:
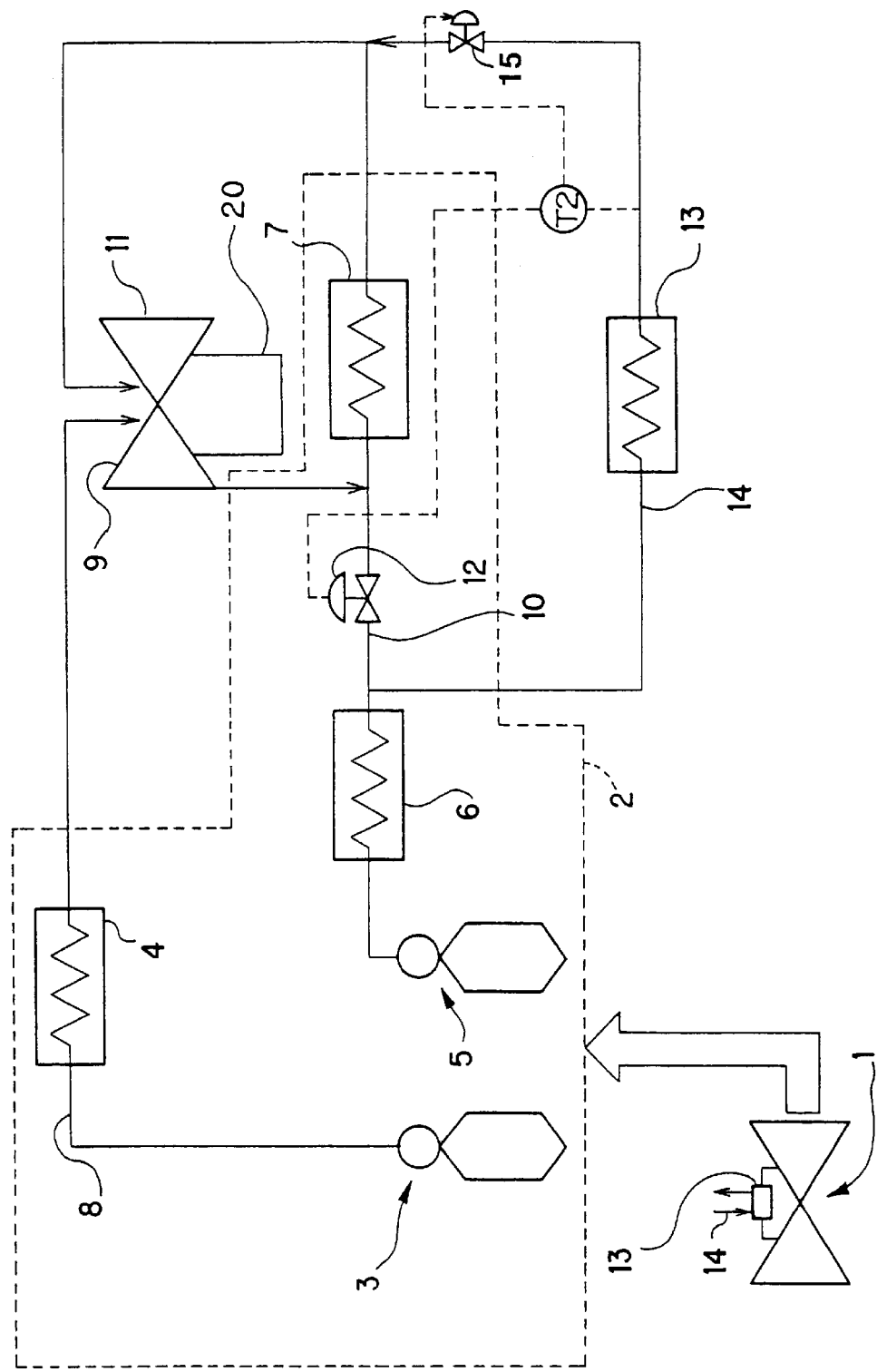
FIG. 6 is a schematic system diagram showing a cooling system of a combined cycle power generation plant equipped with a steam cooling apparatus for a gas turbine according to a third embodiment of the present invention.

As shown in FIG. 6, exhaust gas from a gas turbine 1 is fed to a waste heat recovery boiler 2. In the waste heat recovery boiler 2, a high-pressure drum 3, a high-pressure superheater 4, an intermediate-pressure drum 5, an intermediate-pressure superheater 6, and a reheater 7 are provided. Steam generated in the high-pressure drum 3 is fed through a high-pressure steam introduction passage 8 to a high-pressure steam turbine 9 via the high-pressure superheater 4. Steam generated in the intermediate-pressure drum 5 is fed through an intermediate-pressure steam introduction passage 10 to an intermediate-pressure steam turbine 11 via the intermediate-pressure superheater 6 and the reheater 7. A condenser 20 is coupled to the high-pressure steam turbine 9 and the intermediate-pressure steam turbine 11.

Steam discharged from the high-pressure steam turbine 9 merges into the intermediate-pressure steam introduction passage 10 on the inlet side of the reheater 7, and steam passing through the reheater 7 is fed to the intermediate-pressure steam turbine 11. An intermediate-pressure drum pressure control valve 12 Is provided in the intermediate-pressure steam introduction passage 10 between the intermediate-pressure superheater 6 and the reheater 7. The steam pressure of the intermediate-pressure drum 5 is adjusted to a predetermined state by control for opening or closing the intermediate-pressure drum pressure control valve 12.

A steam cooling passage 14 branches off from the intermediate-pressure steam introduction passage 10 at a site between the intermediate-pressure superheater 6 and the intermediate-pressure drum pressure control valve 12. The steam cooling passage 14 merges into the intermediate-pressure steam introduction passage 10 on the downstream side of the reheater 7 via a combustor 13 or a high-temperature component of the gas turbine 1. That is, the combustor 13 is fed with outlet steam, for example at a temperature of 300° C., from the intermediate-pressure drum 5, as cooling steam, through the steam cooling passage 14, the steam after used in cooling, for example, with a temperature of about 560 to about 600° C., merges with outlet steam of the reheater 7, and the combined steam is guided into the intermediate-pressure steam turbine 11. A control valve 15, as a steam amount control valve, is provided in the steam cooling passage 14 on the outlet side of the combustor 13, and the amount of steam guided to the combustor 13 is adjusted by opening or closing of the intermediate-pressure drum pressure control valve 12 and the control valve 15. The control valve 15 may be provided in the steam cooling passage 14 on the inlet side of the combustor 13. Outlet-temperature detection means T2, as post-cooling steam temperature detection means, is connected to the steam cooling passage 14 between the combustor 13 and the control valve 15. The intermediate-pressure drum pressure control valve 12 and the control valve 15 are opened or closed based on detection information outputted from the outlet-temperature detection means T2 or control means.

The intermediate-pressure drum pressure control valve 12 and the control valve 15 are opened or closed based on the pressure and temperature of cooling steam, the pressure of the intermediate-pressure drum 5, and so on, to feed a predetermined amount of steam to the steam cooling passage 14. Outlet steam, for example having a temperature of about 300° C. of the intermediate-pressure drum 5 is fed as cooling steam to the combustor 13 through the steam cooling passage 14, and thereby cools the combustor 13. The amount of steam guided to the combustor 13 is adjusted by the intermediate-pressure drum pressure control valve 12 and the control valve 15 to feed the desired amount of steam to the combustor 13. The steam after cooling the combustor 13 Is recovered into the intermediate-pressure steam turbine 11. Therefore, a combined cycle power generation plant with a highly efficient cooling system is provided.

When the intermediate-pressure drum pressure control valve 12 and the control valve 15 are controlled to a predetermined state to feed cooling steam in a planned amount, the outlet-temperature detection means T2 may detect that the temperature on the outlet side of the combustor 13 has increased for a certain abnormality. In this case, the intermediate-pressure drum pressure control valve 12 and the control valve 15 are controlled based on the increase in temperature to increase the amount of cooling steam. That is, according to the temperature detected by the outlet-temperature detection means T2, the intermediate-pressure drum pressure control valve 12 is closed to increase the amount of cooling steam fed to the steam cooling passage 14, while the control valve 15 Is opened to increase the amount of cooling steam flowing through the steam cooling passage 14. In this manner, control for opening or closing the intermediate-pressure drum pressure control valve 12 and the control valve 15 is performed such that the amount of opening or closing is increased responsive to the increase in the temperature. For example, the intermediate-pressure drum pressure control valve 12 is fully closed, or alternatively, the control valve 15 is fully opened.

Therefore, when the temperature of cooling steam supplied to the combustor 13 increases due to any abnormality, and therefore poses the risk of damage, the flow rate of cooling steam fed to the combustor 13 is increased to make protection of the combustor 13 possible. Thus, the steam cooling apparatus of the present invention may protect the combustor 13, without using an interlock function, even when the temperature on the outlet side of the combustor 13 increases.

While the present invention has been described by its preferred embodiments, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A steam cooling apparatus for a gas turbine, comprising:
    a waste heat recovery boiler capable of generating steam using exhaust gas provided by the gas turbine;
    a steam turbine capable of operating on steam generated by the waste heat recovery boiler;
    a steam introduction passage capable of introducing steam from the waste heat recovery boiler into the steam turbine, the steam introduction passage coupled between the waste heat recovery boiler and the steam turbine;
    a steam cooling passage provided in the steam introduction passage and adapted to bypass steam from the waste heat recovery boiler for cooling of a high-temperature component of the gas turbine;
    a generated steam pressure detection device capable of detecting a pressure of steam generated by the waste heat recovery boiler;
    a generated steam pressure control valve capable of controlling a flow rate of steam in the steam introduction passage based on detection information from the generated steam pressure detection device, the generated steam pressure control valve coupled to the steam introduction passage, thereby adjusting the pressure of steam generated by the waste heat recovery boiler;
    a post-cooling steam temperature detection device provided in the steam cooling passage on a downstream side of the high-temperature component and adapted to detect a post-cooling temperature of steam after cooling the high-temperature component; and
    a controller capable of performing open/close control of the generated steam pressure control valve so that a detection value of the generated steam pressure detection device becomes a set value which adjusts a flow rate of steam flowing into the steam cooling passage based on a state of the gas turbine, and capable of performing open/close control of the generated steam pressure control valve in order to adjust the flow rate of steam flowing into the steam cooling passage based on detection information from the post-cooling steam temperature detection device.

2. The apparatus according to claim 1, further including an intermediate-pressure drum pressure control valve provided in the steam introduction passage on a downstream side of a branching portion of the steam cooling passage to serve as the generated steam pressure control valve, the steam cooling passage branching off from the steam introduction passage ranging from an intermediate-pressure drum to an intermediate-pressure steam turbine; and wherein the controller is capable of open/close controlling of the intermediate-pressure drum pressure control valve, thereby adjusting the flow rate in the steam cooling passage by restricting the flow rate in the steam introduction passage based on the detection information from the post-cooling steam temperature detection device.

3. The apparatus according to claim 1, further including a high-pressure drum provided in the recovery boiler, and an auxiliary steam introduction passage capable of receiving steam from the high-pressure drum, the auxiliary steam introduction passage connected to the steam cooling passage, wherein the generated steam pressure control valve is an auxiliary steam pressure control valve provided in the auxiliary steam introduction passage, and wherein the controller is capable of performing open/close control of the auxiliary steam pressure control valve, thereby securing the flow rate in the steam cooling passage by controlling the flow rate in the auxiliary steam introduction passage based on the detection information from the post-cooling steam temperature detection device.

4. The apparatus according to claim 1, further including an auxiliary steam introduction passage capable of receiving steam from a high-pressure drum, said auxiliary steam introduction passage connected to the steam cooling passage;

an auxiliary fluid channel connected to the auxiliary steam introduction passage;

an auxiliary steam temperature detection device capable of detecting a temperature of auxiliary steam provided in the auxiliary steam introduction passage on a downstream side of a merging portion of the auxiliary steam introduction passage;

wherein the generated steam pressure control valve is an auxiliary fluid pressure control valve provided in the auxiliary fluid channel; and wherein the controller is capable of performing open/close control of the auxiliary steam pressure control valve, thereby securing the flow rate in the steam cooling passage by controlling the flow rate in the auxiliary fluid channel based on the detection information from the post-cooling steam temperature detection device and detection information from the auxiliary steam temperature detection device.

5. The apparatus according to claim 1, further including a high-pressure drum provided in the recovery boiler; and an auxiliary steam introduction passage capable of receiving steam from the high-pressure drum, said auxiliary steam introduction passage connected to the steam cooling passage, the steam cooling passage branching off from the steam introduction passage ranging from an intermediate-pressure drum to an intermediate-pressure steam turbine;

wherein the generated steam pressure control valve includes an intermediate-pressure drum pressure control valve provided in the steam introduction passage on a downstream side of a branching portion of the steam cooling passage;

wherein the generated steam pressure control valve includes an auxiliary steam pressure control valve provided in the auxiliary steam introduction passage; and wherein the controller is capable of performing open/close control of the intermediate-pressure drum pressure control valve, thereby securing the flow rate in the steam cooling passage by restricting the flow rate in the steam introduction passage based on the detection information from the post-cooling steam temperature detection device, and is capable of performing open/close control of the auxiliary steam pressure control valve, thereby securing the flow rate in the steam cooling passage by controlling the flow rate in the auxiliary steam introduction passage based on the detection information from the post-cooling steam temperature detection device.

6. A steam cooling apparatus for a gas turbine, comprising:

a waste heat recovery boiler capable of generating steam using exhaust gas provided by the gas turbine;

a steam turbine capable of operating on steam generated by the waste heat recovery boiler;

a steam introduction passage capable of introducing steam from the waste heat recovery boiler into the steam turbine, the steam introduction passage coupled between the waste heat recover boiler and the steam turbine;

a steam cooling passage provided in the steam introduction passage and adapted to bypass steam front the waste heat recovery boiler for cooling of a high-temperature component of the gas turbine;

a steam amount control valve provided in the steam cooling passage and adapted to control an amount of steam introduced into the steam cooling passage;

a post-cooling steam temperature detection device provided in the steam cooling passage on a downstream side of the high-temperature component and adapted to detect a post-cooling temperature of steam after cooling the high-temperature component; and a controller capable of performing open/close control of the steam amount control value, thereby adjusting a flow rate of steam flowing into the steam cooling passage based on detection information from the post-cooling steam temperature detection device, and controlling the flow rate of steam flowing into the steam cooling passage to a predetermined state.

7. A steam cooling apparatus for a gas turbine, comprising:

a waste heat recovery boiler capable of generating steam using exhaust gas provided by the gas turbine;

a steam turbine capable of operating on steam generated by the waste heat recovery boiler;

a steam introduction passage capable of introducing steam from the waste heat recovery boiler into the steam turbine, the steam introduction passage coupled between the waste heat recovery boiler and the steam turbine;

a steam cooling passage provided in the steam introduction passage and adapted to bypass steam from the waste heat recovery boiler for cooling of a high-temperature component of the gas turbine;

a generated steam pressure detection device capable of detecting a pressure of steam generated by the waste heat recovery boiler;

a generated steam pressure control valve capable of controlling a flow rate of steam in the steam introduction passage based on detection information from the generated steam pressure detection device in order to adjust the pressure of steam generated by the waste heat recovery boiler;

a steam amount control valve provided in the steam cooling passage and adapted to control an amount of steam introduced into the steam cooling passage;

a post-cooling steam temperature detection device provided in the steam cooling passage on a downstream side of the high-temperature component and adapted to detect a temperature of steam after cooling the high-temperature component; and a controller capable of performing open/close control of the generated steam pressure control valve so that a detection value of the generated steam pressure detection device becomes a set value which adjusts a flow rate of steam flowing into the steam cooling passage based on a state of the gas turbine, and capable of performing open/close control of the generated steam pressure control valve and the steam amount control valve in order to adjust the flow rate of steam flowing into the steam cooling passage based on detection information from the post-cooling steam temperature detection device.

8. The apparatus according to claim 7, further including an intermediate-pressure drum pressure control valve provided in the steam introduction passage on a downstream side of a branching portion of the steam cooling passage to serve as the generated steam pressure control valve, the steam cooling passage branching off from the steam introduction passage ranging from an intermediate-pressure drum to an intermediate-pressure steam turbine; and wherein the controller is capable of performing open/close control of the intermediate-pressure drum pressure control valve, thereby securing the flow rate in the steam cooling passage by restricting the flow rate in the steam introduction passage based on the detection information from the post-cooling steam temperature detection device.

9. The apparatus according to claim 7, further including a high-pressure drum provided in the recovery boiler; and an auxiliary steam introduction passage capable of receiving steam from the high-pressure drum, the auxiliary steam introduction passage connected to the steam cooling passage;

wherein the generated steam pressure control valve is an auxiliary steam pressure control valve provided in the auxiliary steam introduction passage, and wherein the controller is capable of performing open/close control of the auxiliary steam pressure control valve, thereby securing the flow rate in the steam cooling passage by controlling the flow rate in the auxiliary steam introduction passage based on the detection information from the post-cooling steam temperature detection device.

10. The apparatus according to claim 7, further including a high-pressure drum provided in the recovery boiler;

an auxiliary steam introduction passage capable of receiving steam from the high-pressure drum, the auxiliary steam introduction passage connected to the steam cooling passage, the steam cooling passage branching off from the steam introduction passage ranging from an intermediate-pressure drum to an intermediate-pressure steam turbine; and an intermediate-pressure drum pressure control valve provided in the steam introduction passage on a downstream side of a branching portion of the steam cooling passage to serve as the generated steam pressure control valve;

wherein the generated steam pressure control valve is an auxiliary steam pressure control valve provided in the auxiliary steam introduction passage; and wherein the controller is capable of performing open/close control of the intermediate-pressure drum pressure control valve, thereby securing the flow rate in the steam cooling passage by restricting the flow rate in the steam introduction passage based on the detection information from the post-cooling steam temperature detection device, and is capable of performing open/close control of the auxiliary steam pressure control valve, thereby securing the flow rate in the steam cooling passage by controlling the flow rate in the auxiliary steam introduction passage based on the detection information from the post-cooling steam temperature detection device.

11. The apparatus according to any one of claims 7–10, in which the controller is capable of fully opening the steam amount control valve when the post-cooling steam temperature detection device detects that the steam temperature exceeds an upper limit.

12. A steam cooling method for a gas turbine, comprising the steps of:

generating steam by a waste heat recovery boiler using exhaust gas of the gas turbine;

operating a steam turbine by steam generated by the waste heat recovery boiler;

introducing steam, via a steam introduction passage, from the waste heat recovery boiler into the steam turbine;

providing a steam cooling passage in the steam introduction passage capable of bypassing steam from the waste heat recovery boiler for cooling of a high-temperature component of the gas turbine;

detecting a pressure of steam generated by the waste heat recovery boiler thereby forming a detection value;

controlling a flow rate of steam in the steam introduction passage based on the detection value, whereby the pressure of steam generated by the waste heat recovery boiler is adjusted, the controller is via a generated steam pressure control valve located in the steam introduction passage;

detecting, in the steam cooling passage on a downstream side of the high-temperature component, a post-cooling temperature of steam after cooling the high-temperature component; and performing open/close control of the generated steam pressure control valve so that the detection value becomes a set value in order to adjust a flow rate of steam flowing into the steam cooling passage based on a state of the gas turbine and based on the post-cooling steam temperature.

13. A steam cooling system for a gas turbine, comprising:

means for generating steam by a waste heat recovery boiler using exhaust gas of the gas turbine;

means for operating a steam turbine by steam generated by the waste heat recovery boiler;

means for introducing steam, via a steam introduction passage, from the waste heat recovery boiler into the steam turbine;

steam cooling passage means for bypassing steam from the waste heat recovery boiler for cooling of a high-temperature component of the gas turbine;

generated steam pressure detection means for detecting a pressure of steam generated by the waste heat recovery boiler thereby forming a detection value;

generated steam pressure control means for controlling a flow rate of steam in the steam introduction passage based on the detection whereby the pressure of steam generated by the waste heat recovery boiler is adjusted, the controlling is via a generated steam pressure control valve located in the steam introduction passage;

post-cooling steam temperature detection means for detecting, in the steam cooling passage on a downstream side of the high-temperature component, a post-cooling temperature of steam after cooling the high-temperature component; and control means for performing open/close control of the generated steam pressure control valve so that the detection value of the generated steam pressure detection means becomes a set value in order to adjust a flow rate of steam flowing into the steam cooling passage based on a state of the gas turbine and based on the post-cooling steam temperature.

* * * * *